(12) United States Patent
Joseph (10) Patent No.: US 9,610,834 B2
(45) Date of Patent: Apr. 4, 2017

(54) VEHICLE COVER DEVICE

(71) Applicant: Bentsur Joseph, Tel Aviv (IL)

(72) Inventor: Bentsur Joseph, Tel Aviv (IL)

( * ) Notice: Subject to any disclaimer, the term of this patent is extended or adjusted under 35 U.S.C. 154(b) by 0 days.

(21) Appl. No.: 14/986,472

(22) Filed: Dec. 31, 2015

(65) Prior Publication Data

US 2016/0193905 A1    Jul. 7, 2016

(30) Foreign Application Priority Data

Jan. 2, 2015 (GB) .................... 1500007.8

(51) Int. Cl.
| | |
|---|---|
| *B60J 11/00* | (2006.01) |
| *B60J 11/02* | (2006.01) |
| *B60R 19/48* | (2006.01) |
| *B60J 11/04* | (2006.01) |

(52) U.S. Cl.
CPC .............. *B60J 11/02* (2013.01); *B60J 11/04* (2013.01); *B60R 19/48* (2013.01)

(58) Field of Classification Search
CPC .......... A61L 15/20; A61L 15/46; A24F 27/12; A47C 31/11; A61B 5/0408; B60J 11/00; B60J 11/02; B60J 11/06; B60J 1/2091; C08L 23/10
USPC ............. 296/98, 136.1, 136.02, 136.04, 95.1
See application file for complete search history.

(56) References Cited

U.S. PATENT DOCUMENTS

| | | | |
|---|---|---|---|
| 2,230,908 A | 5/1940 | Reiman et al. | |
| 2,666,840 A * | 1/1954 | Poirier | H05B 3/342 135/115 |
| 2,688,513 A * | 9/1954 | Poirier | B60J 11/02 135/115 |
| 2,723,156 A * | 11/1955 | Stanziale | B60J 11/02 293/117 |
| 3,563,594 A | 2/1971 | London | |
| 4,889,171 A * | 12/1989 | Minimo | B60J 11/00 150/166 |
| 4,901,895 A | 2/1990 | Gancarz | |
| 4,925,234 A * | 5/1990 | Park | B60J 11/00 135/119 |
| 4,951,993 A * | 8/1990 | Taboada | B60J 11/00 150/166 |
| 4,958,881 A * | 9/1990 | Piros | B60J 11/00 160/370.22 |
| 5,056,839 A | 10/1991 | Yoon | |

(Continued)

FOREIGN PATENT DOCUMENTS

| | | |
|---|---|---|
| CN | 2343020 Y | 10/1999 |
| CN | 201721296 U | 1/2011 |

(Continued)

*Primary Examiner* — Kiran B Patel
(74) *Attorney, Agent, or Firm* — Mark David Torche Patwrite LLC (57) ABSTRACT

A vehicle cover device including a flexible cover sheet and a car cover compartment configured to be operably attachable to the vehicle including disposed within a bumper of the vehicle. The car cover compartment includes a longitudinally extending cover sheet housing, which is configured to house the flexible cover sheet when in a stored state. The car cover compartment includes a cover-sheet cleaning and retraction mechanism, which includes a striker bar that repeatedly strikes the cover sheet when the cover sheet is retracted into the housing to a non-deployed storage position.

13 Claims, 6 Drawing Sheets

(56) References Cited

U.S. PATENT DOCUMENTS

| | | | | |
|---|---|---|---|---|
| 5,078,330 A * | 1/1992 | Hall | B60J 11/02 | 150/166 |
| 5,176,421 A * | 1/1993 | Fasiska | B60J 11/02 | 150/166 |
| 5,364,155 A * | 11/1994 | Kuwahara | B60J 11/00 | 296/136.04 |
| 5,401,074 A * | 3/1995 | Timerman | B60J 11/00 | 160/370.21 |
| 5,423,588 A * | 6/1995 | Eglinton | B60J 7/085 | 224/324 |
| 5,597,196 A * | 1/1997 | Gibbs | B60J 11/02 | 160/326 |
| 5,823,607 A * | 10/1998 | Hindson | B60J 11/02 | 160/370.21 |
| 5,902,003 A * | 5/1999 | Hindson | B60J 11/02 | 293/128 |
| 6,012,759 A * | 1/2000 | Adamek | B60J 11/02 | 296/136.03 |
| 6,092,857 A * | 7/2000 | Rivas | B60J 11/00 | 296/136.04 |
| 6,131,643 A * | 10/2000 | Cheng | B60J 11/02 | 160/24 |
| 6,276,381 B1 * | 8/2001 | O'Brien | B60J 11/02 | 135/115 |
| 6,513,858 B1 * | 2/2003 | Li | B60J 11/02 | 150/166 |
| 2001/0045758 A1 * | 11/2001 | Vieira-Soares | B60J 11/00 | 296/98 |
| 2002/0157696 A1 * | 10/2002 | O'Brien | B60J 11/00 | 135/87 |
| 2004/0238089 A1 * | 12/2004 | Li | B60J 11/00 | 150/166 |
| 2006/0124164 A1 * | 6/2006 | Pacheco | B60J 11/02 | 135/88.05 |
| 2006/0232095 A1 * | 10/2006 | Sedighzadeh | B60J 11/02 | 296/98 |
| 2007/0096501 A1 * | 5/2007 | Tan | B60J 11/00 | 296/136.1 |
| 2007/0177265 A1 * | 8/2007 | Focardi | B60J 11/025 | 359/509 |
| 2007/0284023 A1 * | 12/2007 | Sitarz | B60J 11/00 | 150/166 |
| 2009/0288891 A1 * | 11/2009 | Budge | B60K 16/00 | 180/2.2 |
| 2012/0306232 A1 * | 12/2012 | Shumaker | E04H 15/06 | 296/136.07 |
| 2013/0300149 A1 | 11/2013 | Dao | | |
| 2014/0312647 A1 * | 10/2014 | Wang | B60J 11/04 | 296/136.02 |
| 2016/0009166 A1 * | 1/2016 | Sassi | B60J 11/04 | 296/98 |

FOREIGN PATENT DOCUMENTS

| | | |
|---|---|---|
| CN | 202573760 U | 12/2012 |
| CN | 203033870 U | 7/2013 |
| CN | 203078285 U | 7/2013 |
| WO | 01/66374 | 9/2001 |
| WO | 2005/068254 | 7/2005 |

\* cited by examiner

VEHICLE COVER DEVICE

FIELD OF THE INVENTION

The present invention relates vehicle accessories, in particular devices for providing protection to vehicles such as from sun, snow, dirt and the like.

BACKGROUND OF THE INVENTION

Traditionally, car covers are most commonly a cloth-like sheet or somewhat fitted sheet that can be draped over the car. Upon removing the sheet, which may become dusty and dirty, the sheet is typically folded and stored in the car's trunk, which may dirty the trunk, not to mention the user, and may take up valuable space in the trunk or other location of the car. Further, depending upon the weather, the cover may get rained on, or snow may accumulate on the cover.

As such, more advanced car cover devices have been devised, and it is believed that the technology relevant to the present invention is disclosed in: U.S. Pat. No. 2,230,908 (Reiman et al., 1940 May 9) "Cover for vehicle bodies"; U.S. Pat. No. 2,666,840 (Poirier, 1954 Jan. 19) "Heated vehicle cover"; U.S. Pat. No. 2,688,513 (Poirier, 1952 Oct. 27) "Power operated vehicle cover"; U.S. Pat. No. 2,723,156 (Stanziale, 1955 Nov. 8) "Self positioning auto cover"; U.S. Pat. No. 3,563,594 (London, 1971 Feb. 16) "Retractable flexible car body"; U.S. Pat. No. 4,901,895 (Gancarz, 1990 Feb. 20) "Truck rear bumper-storage compartment assembly with facility for sheet material storage and dispensing, such as truck bed cover tarpaulins, tents and the like"; U.S. Pat. No. 5,056,839 (Yoon, 1991 Oct. 15) "Automobile cover assembly"; U.S. Pat. No. 6,012,759 (Adamek, 2000 Jan. 11) "Retractable vehicle cover"; U.S. Pat. No. 6,513,858 (Li et al., 2003 Feb. 4) "Roll-up car cover"; US2013/300149 (Dao, 2013 Nov. 14) "Instant car cover"; WO2001/066374 (Stanaszek, 2001 Sep. 13) "Automatic cover for vehicles"; WO2005/068254 (Brodskiy, 2005 Jul. 28) "Retractable vehicle cover"; US2007/177265 (Focardi, 2007 Aug. 2) "Device for the protection of the bodywork of a vehicle"; CN2343020Y (Jiang Chuanjun, 1999 Oct. 13) "Self-rolling weather cover for car"; CN201721296U (Lijin Shi, 2011 Jan. 26) "Tarpaulin with heating function"; CN202573760U (Zhou Dalu, 2012 Dec. 5) "High-efficiency antifriction automobile cover device"; CN203063870U (Song Jingwen, 2013 Jul. 17) "Automobile top cover PV power generation device"; CN203078285U (Gao Desen et al., 2013 Jul. 24) "Movable heating car cover", all of which are incorporated herein by reference.

SUMMARY OF THE INVENTION

The present invention provides a vehicle cover device and vehicle bumper including the cover device.

In accordance with embodiments of one aspect of the present invention there is provided a vehicle cover device for protecting at least a portion of a motor vehicle. The vehicle cover device includes a flexible cover sheet and a car cover compartment configured to be operably attachable to the vehicle including disposed within a bumper of the vehicle. The car cover compartment includes a longitudinally extending cover sheet housing, which is configured to house the flexible cover sheet when in a stored state. The cover compartment includes a longitudinal slot for the passage of the cover sheet through the housing. The vehicle cover device also includes a cover sheet attachment mechanism configured to allow attachment of the cover sheet to the vehicle after covering of the vehicle by the cover sheet. The car cover compartment includes a cover-sheet cleaning and retraction mechanism, which includes a striker bar and is configured to cause the striker bar to repeatedly strike the cover sheet when the cover sheet is retracted into the housing to a non-deployed storage position.

In some embodiments, the cover-sheet cleaning and retraction mechanism includes a ratchet mechanism. In some embodiments, the ratchet mechanism has attached thereto a striker activating disk having a plurality of spaced-apart indentations distributed along the peripheral edge of the disk to operably affect intermittent raising of the striker bar.

In some embodiments, the cover-sheet cleaning and retraction mechanism comprises a striker biasing member. In some embodiments, the striker biasing member is constituted by a leaf spring.

In some embodiments, the cover-sheet cleaning and retraction mechanism comprises a car-cover retraction biasing member. In some embodiments, the car-cover retraction biasing member is constituted by a coil spring.

In some embodiments, the device includes a pair of end caps at respective ends of the car-cover housing and the respective cover-sheet cleaning and retraction devices are received within the pair of end caps.

In some embodiments, the housing is configured to be attachable to a bumper of the vehicle. In some embodiments, the housing is configured to be receivable or housable within a bumper of the vehicle.

In some embodiments, the device includes a cover sheet heater. In some embodiments, the device includes a heater system including any one or combination of a photovoltaic power unit; a battery; and a cable configured for operable attachment to a battery of the vehicle. In some embodiments, the device includes a handle coupled with the cover sheet.

In accordance with embodiments of another aspect of the present invention there is provided a vehicle bumper including a vehicle cover device as noted above.

It is a particular feature of the present car cover device that it includes a car-cover cleaning and retraction mechanism configured to bang or knock on the car-cover sheet while the sheet is being retracted back into its housing after use and/or being pulled from its housing.

BRIEF DESCRIPTION OF THE DRAWINGS

The present invention will be understood and appreciated more fully from the following detailed description taken in conjunction with the appended drawings in which.

The following detailed description of embodiments of the invention refers to the accompanying drawings referred to above. Dimensions of components and features shown in the figures are chosen for convenience or clarity of presentation and are not necessarily shown to scale. Wherever possible, the same reference numbers will be used throughout the drawings and the following description to refer to the same and like parts.

DETAILED DESCRIPTION OF THE INVENTION

The following detailed description of embodiments of the invention may refer to the accompanying drawings. Embodiments and/or limitations featured in the figures are chosen for convenience or clarity of presentation and are not meant to limit the scope of the invention.

Illustrative embodiments of the invention are described below. In the interest of clarity, not all features/components of an actual implementation are necessarily described.

Figure 1:
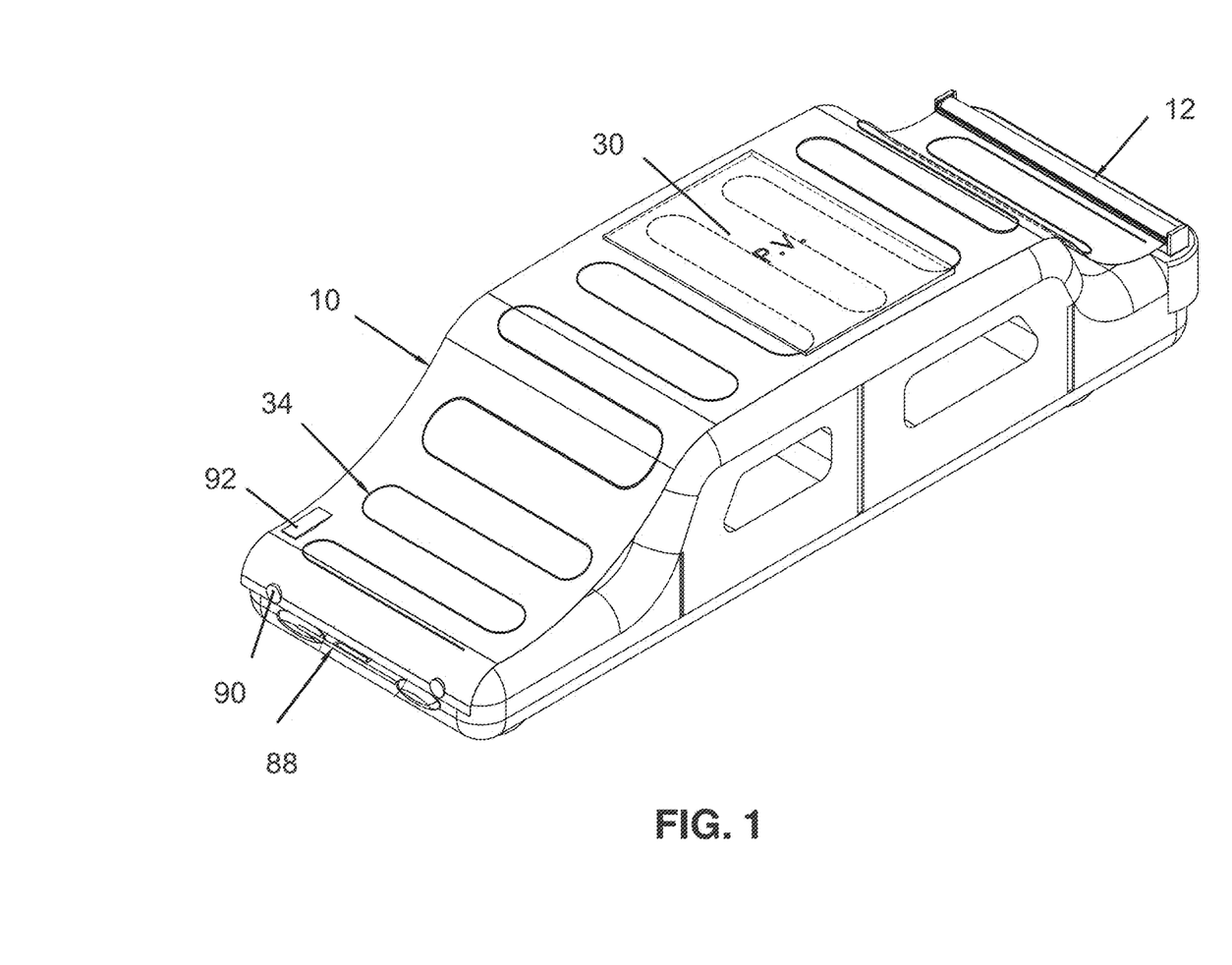
FIG. 1 is a perspective view of an embodiment of a car cover device of the present invention.

FIG. 1 shows an embodiment of the present vehicle cover device in a deployed state covering the hood, roof and trunk of a schematically depicted car body. The vehicle cover device includes a drape or car-cover sheet 10 and car-cover compartment 12 for storing the car-cover sheet when not deployed. In some embodiments, car-cover compartment 12 is configured to be attachable/fastenable to the rear portion of the trunk or rear bumper of the car, by any suitable fastening mechanism (not shown), for example, by magnets, suction cups, screws, bolts and so on. In some embodiments, car-cover sheet 10 includes or is composed of a low-friction material such as PTFE (or derivative) or a glass-epoxy sheet or any suitable material, which can be useful to prevent scratching of the car surface, aid in removal of any dirt on the car-cover sheet and make deployment and retraction easier. Alternatively, car-cover compartment 12 can be configured to be attachable/fastenable to the front portion of the car or front bumper thereof.

Figure 2:
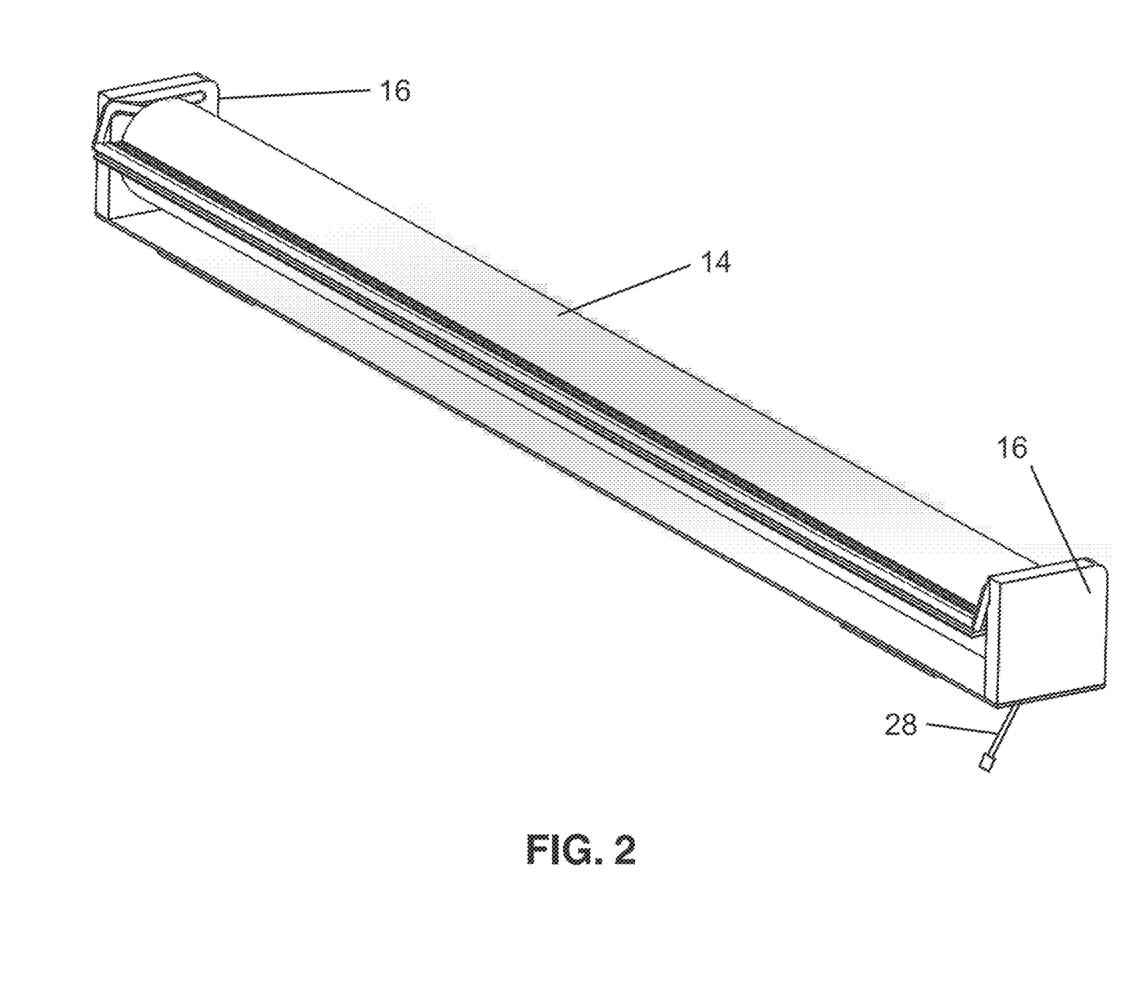
FIG. 2 is an assembled perspective view of a cover compartment of the present car cover device.
Figure 4:
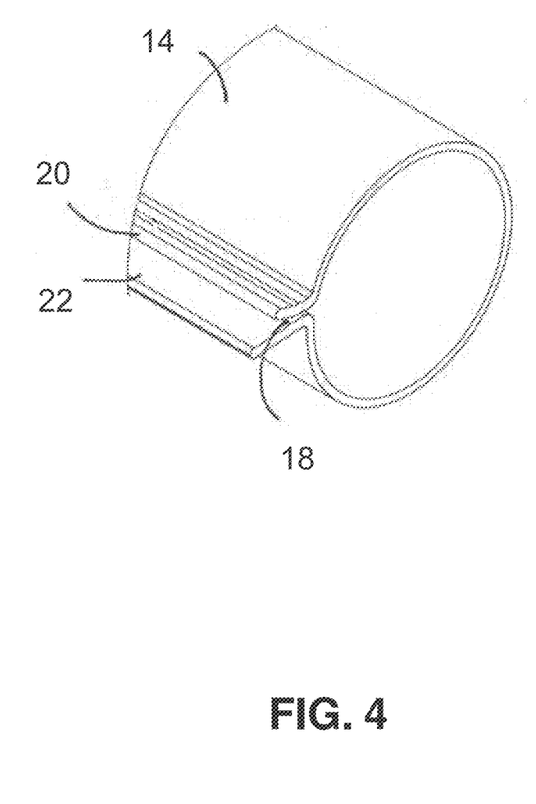
FIG. 4 is an enlarged view of detail "C" of FIG. 3.

FIG. 2 shows car-cover compartment 12 including an elongated cover housing 14 and a pair of housing end caps 16. Cover housing 14 is typically, though not necessarily, cylindrical and has an elongated opening or slot 18 (FIG. 4) parallel to the longitudinal axis of the housing and disposed so that the slot is exposed whereby car-cover sheet 10 can be suitably deployed. As seen better in FIG. 4, elongated slot 18 is defined by upper housing lip 20 and lower housing lip 22; and in some embodiments, one or both of the lips can be at least partially coated with a rubber or silicone-like material to mitigate scratching and/or wear of car-cover sheet 10 and which can be configured for scraping dirt from the top and/or bottom, respectively, of the car-cover sheet.

Figure 3:
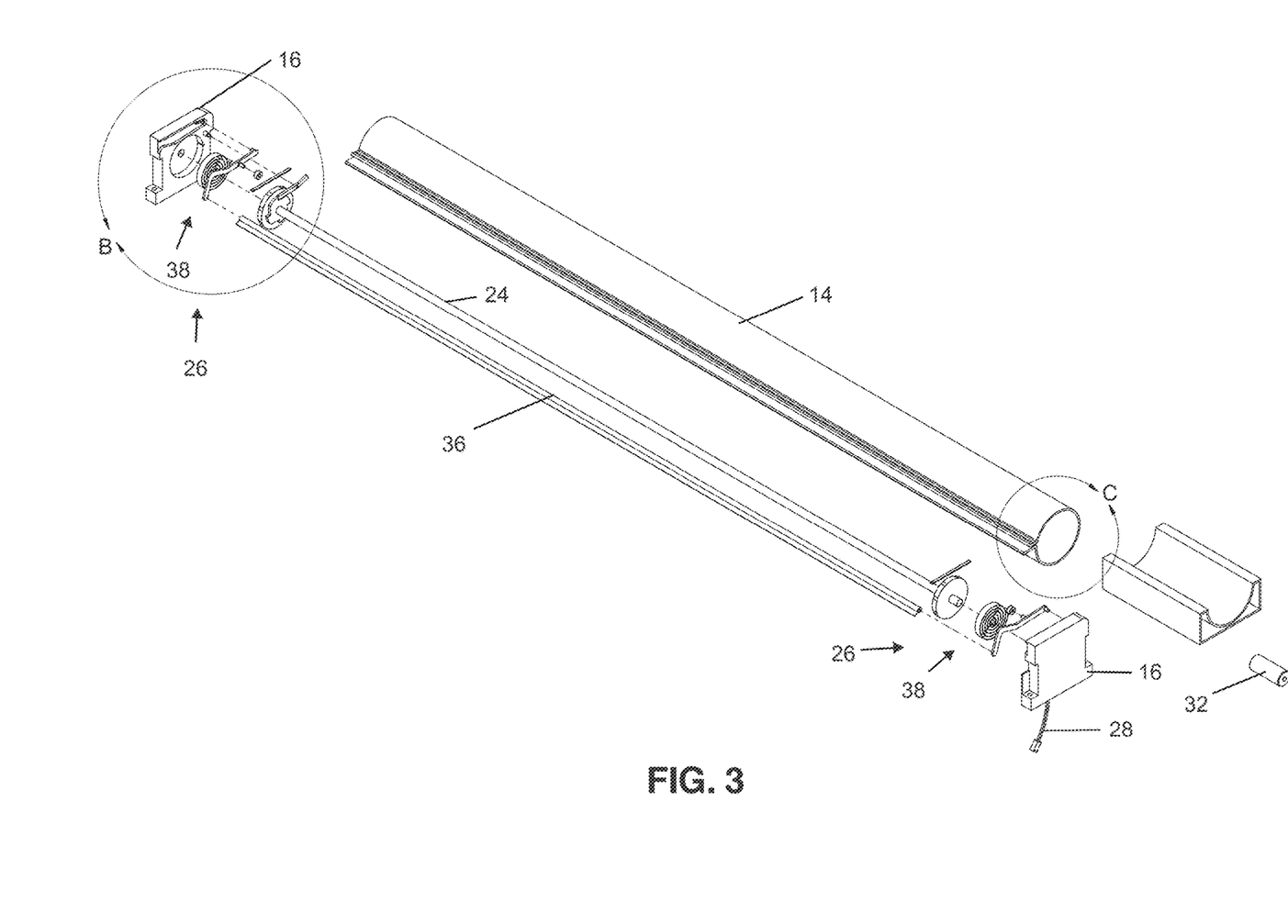
FIG. 3 is an exploded perspective view of the cover compartment of FIG. 2.

FIG. 3 shows more details of car-cover compartment 12 including: a car-cover axle 24, to which car-cover sheet 10 is attached and about which the car-cover is wound in the non-deployed state; and a car-cover cleaning and retraction mechanism 26. Cleaning and retraction mechanism 26 is preferably designed to allow easy and safe deployment and retraction of the sheet 10.

In some embodiments, the vehicle cover device further includes a cover-heating power supply or means exemplified by a power cable 28 connectable to the car's battery (not shown); and/or a battery that can be housed, for example, in a battery housing 32; and/or a photovoltaic power unit 30 (FIG. 1), as the case may be. The cover-heating power supply is operably connected to a car-cover heater 34 (FIG. 1). Heater 34 can be useful to help melt any snow, sleet or ice that may be on the cover sheet, which can make retraction of cover sheet 10 back into housing 14 easier, and of course reduces the possible need for manual snow removal by the user. Car-cover cleaning and retraction mechanism 26 includes a car-cover striker bar 36 operated by a pair of car-cover dispenser/retractor and cleaning devices 38, one of each of the devices located at either end of housing 14 and associated with (i.e. housed in or adjacent) housing end caps 16.

Figure 5:
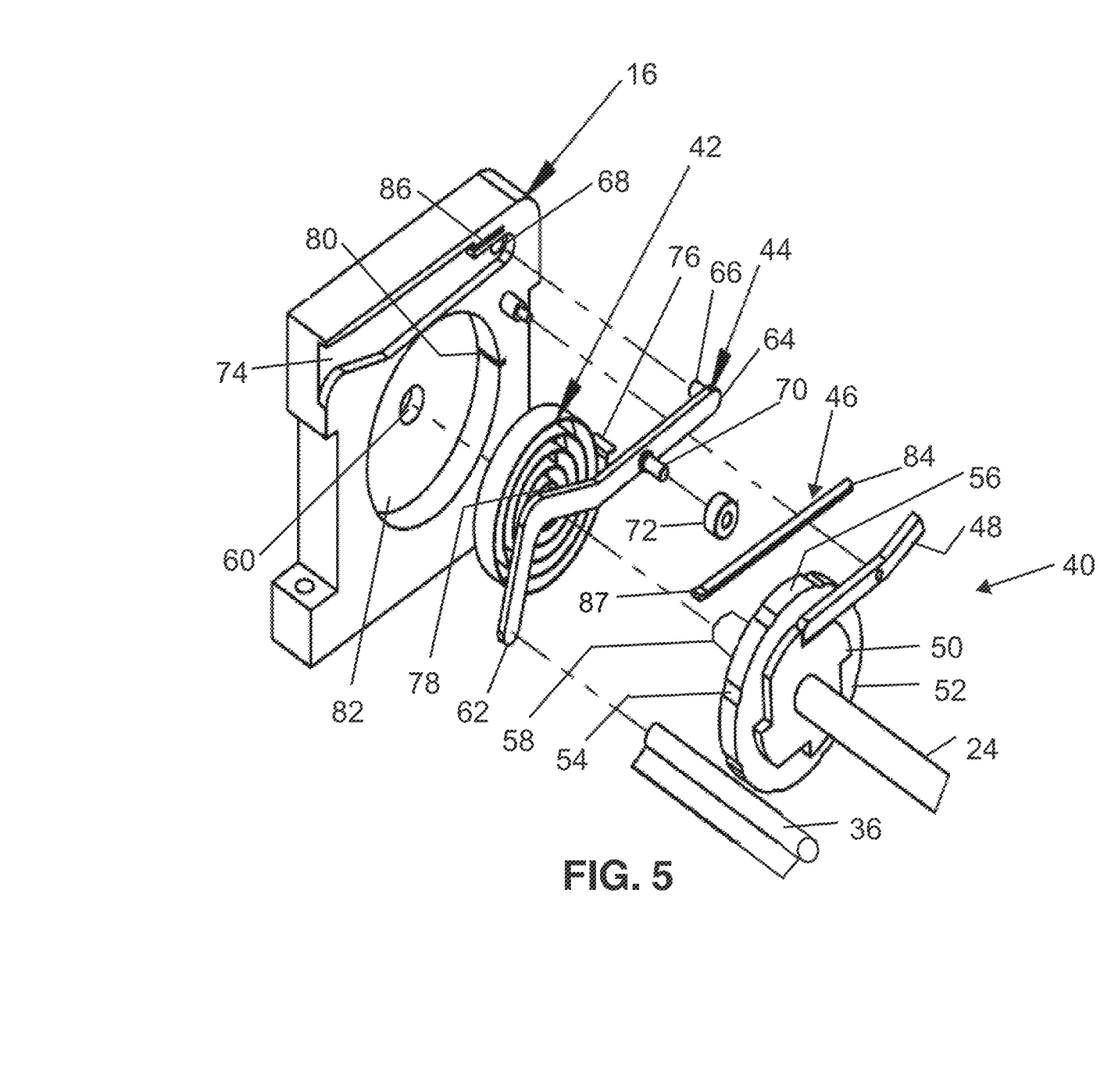
FIG. 5 is an enlarged view of detail "B" of FIG. 3.
Figure 6:
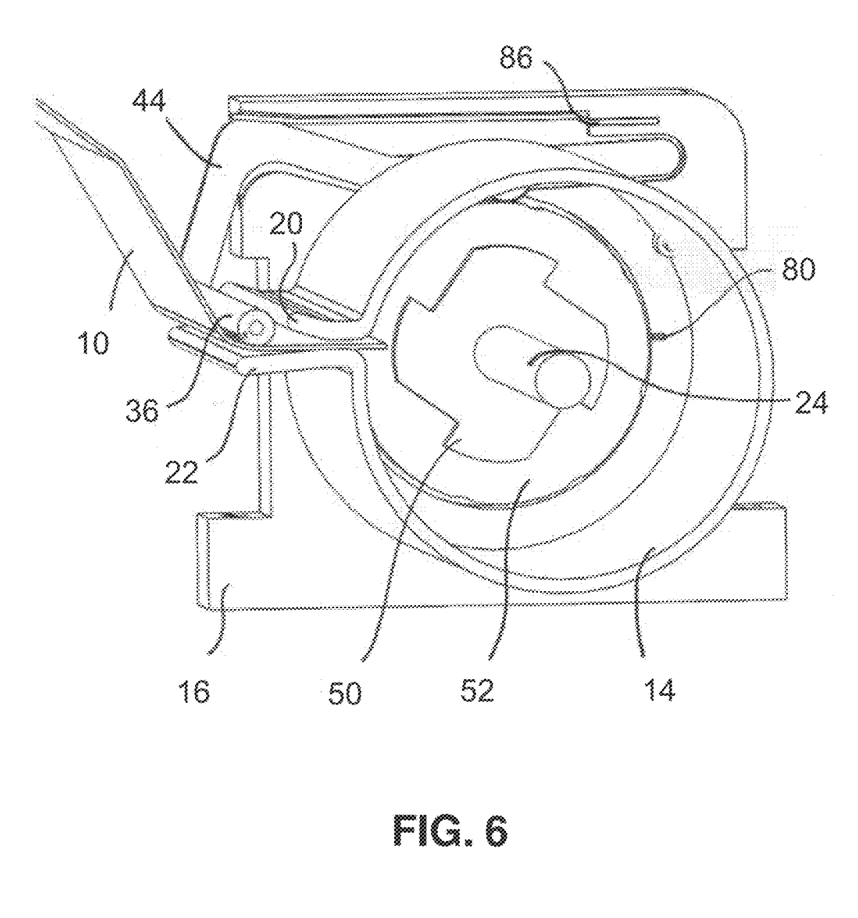
FIG. 6 is a slightly perspective assembled view of FIG. 5.

FIGS. 5 and 6 show details of one of the car-cover dispenser/retractor and cleaning devices 38. Device 38 includes a ratchet mechanism 40; a car-cover retraction biasing member 42, for example a coil spring as illustrated; a cover-cleaning striker lever 44; and a striker biasing member 46, exemplified by a leaf spring.

Ratchet mechanism 40 includes a pawl 48 and a gear wheel 50, which is attached to a striker activating disk 52 having a plurality of spaced-apart indentations 54 distributed along the peripheral edge 56 of the disk. In some embodiments, instead of indentations 54, peripheral edge 56 includes a plurality of ribs (not shown). Car-cover axle 24 passes through the center of gear wheel 50 and disk 52, and typically has free ends 58 that are respectively received in recesses 60 of housing end caps 16.

Cover-cleaning striker lever 44 has a striker lever end 62, to which striker bar 36 is attached) and an anchored end 64 with an anchor pin 66 rotatably receivable within a pin receiving recess 68 in end cap 16. Striker lever 44 also has a striker activating pin 70 that operably interfaces with peripheral edge 56 of disk 52. In some embodiments, activating pin 70 directly interfaces with disk 52 and is slidably receivable in disk indentations 54. In some embodiments, a striker activating ring 72, which may be rotatable about pin 70, is seated on pin 70 in which case ring 72 interfaces with disk 52 and is slidably receivable in disk indentations 54. Striker lever 44 may be disposed in a striker receiving recess 74 that allows for movement of the striker therein. Each striker lever end 62 of respective striker levers is respectively connected to ends of striker bar 36.

Car-cover retraction biasing member 42 may be a coil spring having an anchoring end or lip 76 and an end 78 operably attached to free end 58 of axle 24. Alternatively, biasing member 42 could be constituted by an elastic member (not illustrated), mutatis mutandis, or other appropriate component/mechanism. Anchoring lip 76 can be anchored in a lip receiving slot 80 and biasing member 42 may be disposed in biasing member receiving recess 82.

Striker biasing member 46 has an anchoring end 84, receivable within a striker biasing member anchoring end receiving slot 86; and a free end 87, configured and disposed to interface with and urge striker lever 44 and thus striker bar 36, toward car-cover sheet 10.

Reverting to FIG. 1, sheet 10 typically has a grip portion or handle 88; a car-cover securing mechanism 90 to removably attach the handle or the leading edge of car cover sheet 10 to the car (e.g. one or more magnets, hooks, suction cups or the equivalent). Grip portion or handle 88 is preferably designed to prevent sheet 10 from being fully retracted into housing 14, or some other design is employed for such purpose. Heater 34 may also include a temperature sensor 92, which may be useful for monitoring the temperature of the car cover sheet, especially to help prevent any potential overheating thereof; and for which purpose the device may also include an associated controller (not shown).

To deploy car-cover sheet 10, the sheet is pulled from housing 14, unrolling from axle 24, to cover the vehicle and is typically attached to a hood, bonnet or far bumper of the vehicle via car-cover securing mechanism 90. Unrolling sheet 10 causes car cover axle 24 to spin and thus ratchet mechanism 40 operates to help prevent the sheet from inadvertently retracting back into housing 14. Spinning of axle 24 also rotates disk 52. Due to striker biasing member 46 urging cover-cleaning striker lever 44 toward sheet 10, striker activating ring 72 is urged into contact with peripheral edge 56 of disk 52 and thus the ring repeatedly enters and exits spaced-apart indentations 54 along the peripheral edge. As a result, striker lever 44, in particular free striker lever end 62, is lifted and falls causing striker bar 36 to repeatedly strike sheet 10, thereby helping to clean the sheet. Deploying sheet 10 causes retraction biasing member 42 to be tensioned, which aids in retracting the sheet upon uncovering the vehicle. During retraction of sheet 10 back into housing 14, the same striking action occurs, for the same reason, although disk 52 spins in the opposite direction.

A detachable version of the vehicle cover device can be stored in the trunk when not intended for use and attached to the bumper prior to deployment. Such version can include magnets, suction cups or other such attachment mechanism to attach the device to the vehicle. Alternatively, the vehicle cover device can be designed to be permanently attached to the trunk or bumper or designed integrally with the bumper. The vehicle cover device can be designed in an aesthetic manner e.g. to mimic a "spoiler" or the like.

It should be understood that the above description is merely exemplary and that there are various embodiments of the present invention that may be devised, mutatis mutandis, and that the features described in the above-described embodiments, and those not described herein, may be used separately or in any suitable combination; and the invention can be devised in accordance with embodiments not necessarily described above.

What is claimed is:

1. A vehicle cover device for protecting at least a portion of a motor vehicle, the device comprising:
    a flexible cover sheet;
    a car cover compartment configured to be operably attachable to the vehicle including disposed within a bumper of the vehicle and comprising a longitudinally extending cover sheet housing, which is configured to house the flexible cover sheet when in a stored state and comprising a longitudinal slot for the passage of the cover sheet through the housing; and
    a cover sheet attachment mechanism configured to allow attachment of the cover sheet to the vehicle after covering of the vehicle by the cover sheet,
    wherein the car cover compartment comprises a cover-sheet cleaning and retraction mechanism, which comprises a striker bar and is configured to cause the striker bar to repeatedly strike the cover sheet when the cover sheet is retracted into the housing to a non-deployed storage position.

2. The device of claim 1, wherein the cover-sheet cleaning and retraction mechanism comprises a ratchet mechanism.

3. The device of claim 2, wherein the ratchet mechanism has attached thereto a striker activating disk having a plurality of spaced-apart indentations distributed along the peripheral edge of the disk to operably affect intermittent raising of the striker bar.

4. The device of claim 1, wherein the cover-sheet cleaning and retraction mechanism comprises a striker biasing member.

5. The device of claim 2, wherein the striker biasing member is constituted by a leaf spring.

6. The device of claim 1, wherein the cover-sheet cleaning and retraction mechanism comprises a car-cover retraction biasing member.

7. The device of claim 2, wherein the car-cover retraction biasing member is constituted by a coil spring.

8. The device of claim 1, comprising a pair of end caps at respective ends of the car-cover housing and the respective cover-sheet cleaning and retraction devices are received within the pair of end caps.

9. The device of claim 1, wherein the housing is configured to be attachable to a bumper of the vehicle.

10. The device of claim 1, further comprising a cover sheet heater.

11. The device of claim 1, wherein the housing is configured to be receivable or housable within a bumper of the vehicle.

12. The device of claim 1, further comprising a heater system including any one or combination of a photovoltaic power unit; a battery; and a cable configured for operable attachment to a battery of the vehicle.

13. The device of claim 1, further comprising a handle coupled with the cover sheet.

\* \* \* \* \*